United States Patent
Kushibiki et al.

(10) Patent No.: US 7,045,243 B2
(45) Date of Patent: May 16, 2006

(54) CELL PLATE STRUCTURE FOR FUEL CELL, MANUFACTURING METHOD THEREOF AND SOLID ELECTROLYTE TYPE FUEL CELL

(75) Inventors: Keiko Kushibiki, Kanagawa-ken (JP); Fuminori Satou, Kanagawa-ken (JP); Mitsugu Yamanaka, Kanagawa-ken (JP); Masaharu Hatano, Kanagawa-ken (JP); Naoki Hara, Kanagawa-ken (JP); Tatsuhiro Fukuzawa, Kanagawa-ken (JP); Itaru Shibata, Kanagawa-ken (JP); Makoto Uchiyama, Kanagawa-ken (JP)

(73) Assignee: Nissan Motor Co., Ltd., Kanagawa (JP)

( * ) Notice: Subject to any disclaimer, the term of this patent is extended or adjusted under 35 U.S.C. 154(b) by 378 days.

(21) Appl. No.: 10/150,931

(22) Filed: May 21, 2002

(65) Prior Publication Data

US 2002/0177025 A1    Nov. 28, 2002

(30) Foreign Application Priority Data

May 22, 2001   (JP) ............................ P2001-152885

(51) Int. Cl.
 *H01M 8/02* (2006.01)
 *H01M 8/10* (2006.01)
(52) U.S. Cl. .......................................... 429/34; 429/30
(58) Field of Classification Search .................. 429/30, 429/34, 32, 18
 See application file for complete search history.

(56) References Cited

U.S. PATENT DOCUMENTS 5,509,942 A * 4/1996 Dodge ....................... 29/623.2

FOREIGN PATENT DOCUMENTS

| DE | 42 13 728 A1 | 10/1993 |
|---|---|---|
| EP | 516417 A1 * | 12/1992 |
| JP | 4-62759 | 2/1992 |
| JP | 5-36417 | 2/1993 |
| JP | 5-47391 | 2/1993 |
| JP | 05-121084 | 5/1993 |
| JP | 5-174848 | 7/1993 |
| JP | 06076836 A * | 3/1994 |
| JP | 6-096791 | 4/1994 |
| JP | 6-111838 | 4/1994 |
| JP | 9-045337 | 2/1997 |
| JP | 9-50812 | 2/1997 |
| JP | 9-050812 | 2/1997 |

OTHER PUBLICATIONS

M. Lang, et al. "Characterisation of Plasma Sprayed Thin Film SOFC for Reduced Operating Temperatures" pp. 231-240.

* cited by examiner

*Primary Examiner*—Stephen J. Kalafut
(74) *Attorney, Agent, or Firm*—McDermott Will & Emery LLP

(57) ABSTRACT

A cell plate structure for a fuel cell is provided with a porous substrate, a lower electrode layer formed on the porous substrate, an upper electrode layer opposed to the lower electrode layer, a solid electrolyte layer having a layer element placed between the lower electrode layer and the upper electrode layer and composed of a plurality of divided electrolyte regions, a gas impermeable layer correspondingly covering an area where the solid electrolyte layer is absent on the porous substrate or on the lower electrode layer. The gas impermeable layer separates gas passing inside the porous substrate and gas passing outside the porous substrate. Such a cell plate structure is suited for use in a solid electrolyte type fuel cell.

10 Claims, 8 Drawing Sheets

CELL PLATE STRUCTURE FOR FUEL CELL, MANUFACTURING METHOD THEREOF AND SOLID ELECTROLYTE TYPE FUEL CELL

BACKGROUND OF THE INVENTION

The present invention relates to a cell plate structure for a fuel cell, a manufacturing method thereof and a solid electrolyte type fuel cell and, more particularly, to a cell plate structure for a fuel cell wherein an electrode and a solid electrolyte layer are laminated on a porous substrate, a manufacturing method thereof, and a solid electrolyte type fuel cell employing such a cell plate structure.

In recent years, a great attention has heretofore been focused on fuel cells that generate electric power output at a high efficiency without emitting harmful exhaust gases and that serve as clean energy sources. Among these fuel cells, a solid oxide electrolyte type fuel cell (hereinafter referred to as SOFC) employs a solid electrolyte as electrolyte that achieves electrochemical reaction to provide an electric energy output.

The SOFC employs electrolyte composed of solid electrolyte with oxide ion conductivity such as stabilized zirconia added with yttria, with the electrolyte having both surfaces formed with porous electrodes to allow the solid electrolyte to serve as a partition wall whose one side is supplied with fuel gas such as hydrogen or hydrocarbon and the other side is supplied with oxidizing gas such as air or oxygen to permit the fuel cell to operate at a temperature of 1000° C.

With such a structure, the solid electrolyte has an electrical conductivity lower about by one digit number than that of the electrolyte of a phosphoric acid type fuel cell or a molten carbonate type fuel cell. In general, electrical resistance of the electrolyte portion forms a loss in electric power generation output. In order to improve an electric power generating output density, it is important form the slid electrolyte to be formed in a thin film to reduce electrical resistance of the film as low as possible.

Thus, even when, in the SOFC, the solid electrolyte is formed in the thin film as an electrolyte film, the electrolyte film layer needs a large surface area to some extent for ensuring an operating performance of the fuel cell and, hence, a cell structure with an increased mechanical strength formed with the electrolyte film is employed.

Japanese Patent Application Laid-Open Publication No. H5-36417 and Japanese Patent Application Laid-Open Publication No. H9-50812 respectively disclose structures wherein a plate-like or hollow substrate composed of either one of electrodes, i.e. air electrode material is formed with a solid electrolyte layer and a fuel electrode, which forms either one of the electrodes, in sequence, such as a structure wherein the substrate, supporting the solid electrolyte, also serves as the other electrode.

European SOFC Forum (issued in 2000), on pages 231 to 240, describes so-called electric power generating three layers (a first electrode layer/a solid electrolyte layer/and a second electrode layer) formed on the porous metallic substrate by thermal plasma spraying method.

SUMMARY OF THE INVENTION

However, as in the structure described in Japanese Patent Application Laid-Open Publication No. H5-36417, when forming the electrolyte layer on the substrate that serves one of the electrodes and forming the other electrode on the electrolyte layer in sequence, the substrate is required to have both functions as a substrate and an electrode. Namely, there are many requirements wherein (a) in order for the cell plate to have an adequate strength, the cell plate should preferably have a lower porosity rate in light of requirement for heat resistant strength at a high temperature, (b) when forming an electrode reacting field, the cell plate should preferably have a suitable porosity rate with a view to increasing a surface area of the reacting field, (c) with respect to current collection for generated electricity, the cell plate should preferably have the lower porosity rate in light of reduction in electrical resistance, (d) in order to have a preferable gas diffusion, the cell plate should preferably have an increased porosity rate with a view to increasing the amounts of oxidizing gas or fuel gas to be supplied to the reacting field, and (e) with respect to the shape of the electrolyte layer, the electrolyte layer should preferably have the lower porosity rate with a high degree of flatness in view of forming a further thin and dense electrolyte layer. Nevertheless, it is extremely difficult to obtain an electrode plate that has a porosity rate adequately satisfying all of these requirements.

Further, while Japanese Patent Application Laid-Open Publication No. H9-50812 discloses an electrode substrate formed in a three-layered structure to satisfy the requirements (a) to (e) described above, such an electrode forming technique encounters a difficulty in controlling manufacturing conditions for unitarily baking plural layers in different density and is far from comparable improvement in production yield.

Furthermore, with the electric power generating three layers formed on the porous metallic substrate by a thermal spraying method, it is a general practice to use metallic material having an increased strength and a high electric conductivity to allow the resulting electrode plate to have an increased porosity rate suited for the above requirement (d) for thereby satisfying the above requirements (a) and (c) to enable improvement in electric power generating performance. However, the resulting electrode plate undergoes another issue caused in the plural layers that are peeled off from one another due to a difference in thermal expansion rate between the substrate material and the electrode material or between the substrate material and the electrolyte material, with a resultant tendency in deterioration in heat-resistant shock property.

The present invention has been completed with the above view and has an object to provide a cell plate structure for a fuel cell, a manufacturing method thereof and a solid electrolyte type fuel cell employing such a cell plate structure.

According to one aspect of the present invention, a cell plate structure for a fuel cell, comprises: a porous substrate; a lower electrode layer formed on the porous substrate; an upper electrode layer opposed to the lower electrode layer; a solid electrolyte layer having a layer element placed between the lower electrode layer and the upper electrode layer and composed of a plurality of divided electrolyte regions; and a gas impermeable layer correspondingly covering an area where the solid electrolyte layer is absent on the porous substrate or on the lower electrode layer. The gas impermeable layer separates gas passing inside the porous substrate and gas passing outside the porous substrate.

In other words, a cell plate structure for a fuel cell, comprises: a porous substrate; a lower electrode layer formed on the porous substrate; an upper electrode layer opposed to the lower electrode layer; a solid electrolyte layer having a layer element placed between the lower electrode layer and the upper electrode layer and composed of a plurality of divided electrolyte regions; and separating means for separating gas passing inside the porous substrate and gas passing outside the porous substrate. The separating means correspondingly covers an area where the solid electrolyte layer is absent on the porous substrate or on the lower electrode layer.

In the meantime, according to the present invention, a method for manufacturing a cell plate structure for a fuel cell, comprises: preparing a porous substrate; forming a gas impermeable layer on the porous substrate; forming a lower electrode layer on the porous substrate at an area where the gas impermeable layer is absent; forming a solid electrolyte layer to have a plurality of divided electrolyte regions; and forming an upper electrode layer in opposed relation to the lower electrode layer such that the solid electrolyte layer has a layer element interposed between the lower electrode layer and the upper electrode layer. The gas impermeable layer covers an area where the solid electrolyte layer is absent on the porous substrate. And the gas impermeable layer separates gas passing inside the porous substrate and gas passing outside the porous substrate.

Further, according to the present invention, a method for manufacturing a cell plate structure for a fuel cell, comprises: preparing a porous substrate; forming a lower electrode layer on the porous substrate; forming a gas impermeable layer on the porous substrate at an area where the lower electrode is absent; forming a solid electrolyte layer to have a plurality of divided electrolyte regions; and forming an upper electrode layer in opposed relation to the lower electrode layer such that the solid electrolyte layer has a layer element interposed between the lower electrode layer and the upper electrode layer. The gas impermeable layer covers an area where the solid electrolyte layer is absent on the lower electrode layer. And the gas impermeable layer separates gas passing inside the porous substrate and gas passing outside the porous substrate.

Furthermore, according to the present invention, a method for manufacturing a cell plate structure for a fuel cell, comprises: preparing a porous substrate; forming a gas impermeable layer on the porous substrate; preparing a temporary substrate; forming a solid electrolyte layer on the temporary substrate to have a plurality of divided electrolyte regions; laminating the porous substrate, which is formed with the gas impermeable layer, and the solid electrolyte layer, which is formed on the temporary substrate, with respect to one another via a lower electrode layer having an adhesive function such that the lower layer electrode is placed on the porous substrate at an area where the gas impermeable layer is absent; removing the temporary substrate from the solid electrolyte layer after the porous substrate and the solid electrolyte layer formed on the temporary substrate are laminated to each other via the lower electrode layer; and forming an upper electrode layer in opposed relation to the lower electrode layer such that the solid electrolyte layer has a layer element interposed between the lower electrode layer and the upper electrode layer. The gas impermeable layer covers an area where the solid electrolyte layer is absent on the porous substrate. And the gas impermeable layer separates gas passing inside the porous substrate and gas passing outside the porous substrate.

In the meantime, according to the present invention, a solid electrolyte type fuel cell, comprises: a cell plate structure for a fuel cell; and a support member supporting the cell plate structure for the fuel cell. The cell plate structure for the fuel cell is provided with: a porous substrate; a lower electrode layer formed on the porous substrate; an upper electrode layer opposed to the lower electrode layer; a solid electrolyte layer having a layer element placed between the lower electrode layer and the upper electrode layer and composed of a plurality of divided electrolyte regions; and a gas impermeable layer correspondingly covering an area where the solid electrolyte layer is absent on the porous substrate or on the lower electrode layer such that the gas impermeable layer separates gas passing inside the porous substrate and gas passing outside the porous substrate. A plurality of cell plate structures, each of which corresponds to the cell plate structure, are laminated with the support member.

Other and further features, advantages, and benefits of the present invention will become more apparent from the following description taken in conjunction with the following drawings.

DETAILED DESCRIPTION OF THE PREFERRED EMBODIMENT

Figure 1A:
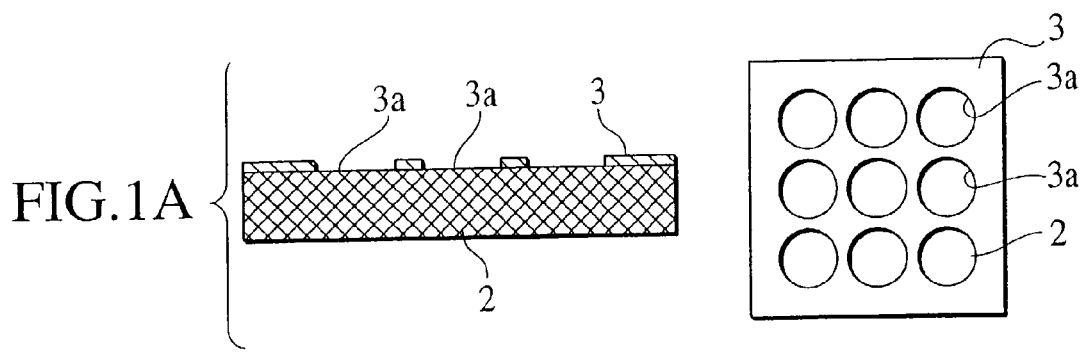
FIGS. 1A to 1E show cross sectional views and plan views for sequentially illustrating a manufacturing process for a cell plate structure for a fuel cell of a first example of a preferred embodiment according to the present invention, in which the cross sectional views are illustrated at the left sides of these FIGS. 1A to 1E and the plan views are illustrated at the right sides of these FIGS. 1A to 1E, respectively.

Initially, before entering into details of cell plate structures or the like of several examples as described later, a cell plate structure (which is some times generally referred to as a fuel cell plate) for a fuel cell of a preferred embodiment according to the present invention is briefly described below suitably with reference to a related manufacturing method of the present invention.

The drawings, which are referred to in conjunction with the cell plate structure of the preferred embodiment according to the present invention that is briefly described below, will be specifically discussed later in detail with reference to the cell plate structures or the like of the several examples.

Further, throughout the whole description of the specification, although one surface of each layer of a substrate and an electrolyte is referred to as an upper surface while the other surface is referred to as a lower surface and, correspondingly, electrode layers are referred to as an upper electrode layer, a lower electrode layer, etc., for the sake of convenience, it is to be appreciated that these expressions merely stand for relative positional relationships and, in an actually practical use, the upper electrode layer does not necessarily assume a parallel arrangement above the lower electrode layer. Thus, it is to be understood that in dependence on situations, the upper surface of one particular component part may, of course, be possibly used in vertically located or inclined conditions.

As shown in FIGS. 1A to 11, the cell plate structure 1 for the fuel cell of the preferred embodiment is comprised of a porous substrate 2, a lower electrode layer 4 formed thereon, a solid oxide electrolyte layer 5 formed above the lower electrode layer 4 and an upper electrode layer 6 formed on the solid electrolyte layer 5, with the porous substrate 2, the lower electrode layer 4, the solid electrolyte layer 5 and the upper electrode layer 6 being held in a laminated structure. In such a laminated structure, at least the solid electrolyte layer 5 is comprised of a plurality of divided electrolyte regions, with blank areas in which the solid electrolyte layer 5 is absent being suitably covered with a gas impermeable layer 3.

With such a structure as set forth above, since the substrate does not bear as an electrode but bears as an independent body, the substrate may be made of optimum material in consideration of a difference in thermal expansion coefficients of the electrode layer and the solid electrolyte layer resulting in a comparable improvement in heat resistance and heat-resistant shock property. Further, the presence of the plurality of divided electrolyte regions formed on the substrate effectively precludes the electrolyte layer 5, which also acts as a gas barrier, from being adversely affected with thermal stress in a highly reliable manner.

Here, the porous substrate 2 may be made of any suitable porous material with a porosity rate having a function of a gas flow passage, such as, for example, a porous body selected from the group consisting of alumina, titania, zirconia, cordierite and gypsum or a non-woven fabric such as SiC fiber or $Si_3N_4$ fiber. Also, alternatively, the porous body may be made of a sintered body, which has a thermal expansion coefficient closer to those of the lower electrode layer 4 and the solid oxide electrolyte layer 5, such as electrode material selected from the group consisting of $La_{1-x}Sr_xMnO_3$ (LSM), $La_{1-x}Sr_xCoO_3$ (LSC), Ni and stainless steel.

Figure 5:
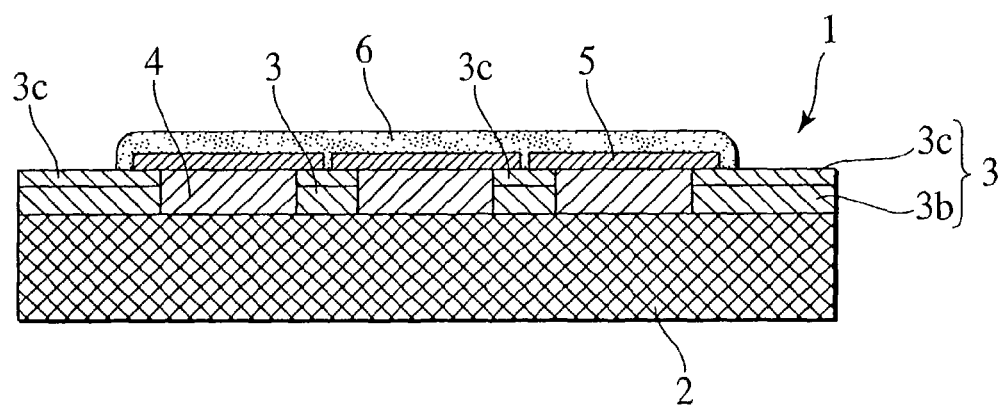
FIG. 5 shows a cross sectional view of a cell plate structure for a fuel cell of a fifth example of the preferred embodiment according to the present invention, with the cell plate structure employing a gas impermeable layer composed of metal whose surface is subjected to an electrically insulating treatment.

Besides, the gas impermeable layer 3 requires functions to shield fuel gas and air and may be made of electrically insulating material such as glass or ceramic, metallic material having electrical conductivity or oxide material. Also, as shown in FIG. 5, the gas impermeable layer may take the form of a two-layer structure wherein the metallic material is coated at its surface with electrically insulating material.

Further, the upper or the lower electrode layers 4, 6 may be made of nickel, nickel cermet and platinum when serving as fuel electrode material, or may be made of Perovskite type oxide material such as $La_{1-x}Sr_xMnO_3$ and $La_{1-x}Sr_xCoO_3$ or silver when serving as air electrode material. It is of course to be noted that the fuel electrode and the air electrode may not be limited to the particular materials discussed above.

Furthermore, the solid oxide electrolyte layer 5 may be made of material containing principal elements such as stabilized zirconia ($ZrO_2$) including solid solutions selected from the group consisting of $Nd_2O_3$, $Sm_2O_3$, $Y_2O_3$, $GdO_3$, $Sc_2O_3$ and $CeO_2$, $Bi_2O_3$ and $LaGaO_3$, but is not limited to these elements.

In addition, the solid oxide electrolyte layer 5 employing such materials is formed on the single substrate in a plurality of, i.e. in at least more than two divided areas which are designated at reference numerals 5a, 5b . . . , and may be formed in various contoured profiles such as a round shape, a square shape or a polygonal shape. Division of such solid oxide electrolyte layer 5 is not intended for formation of gas flow passages but for improvement over the heat-resistant shock property and, so, adjacent electrolyte regions 5a, 5b may be preferably spaced from one another in a narrow distance with a view to improving a power output density.

Figure 3:
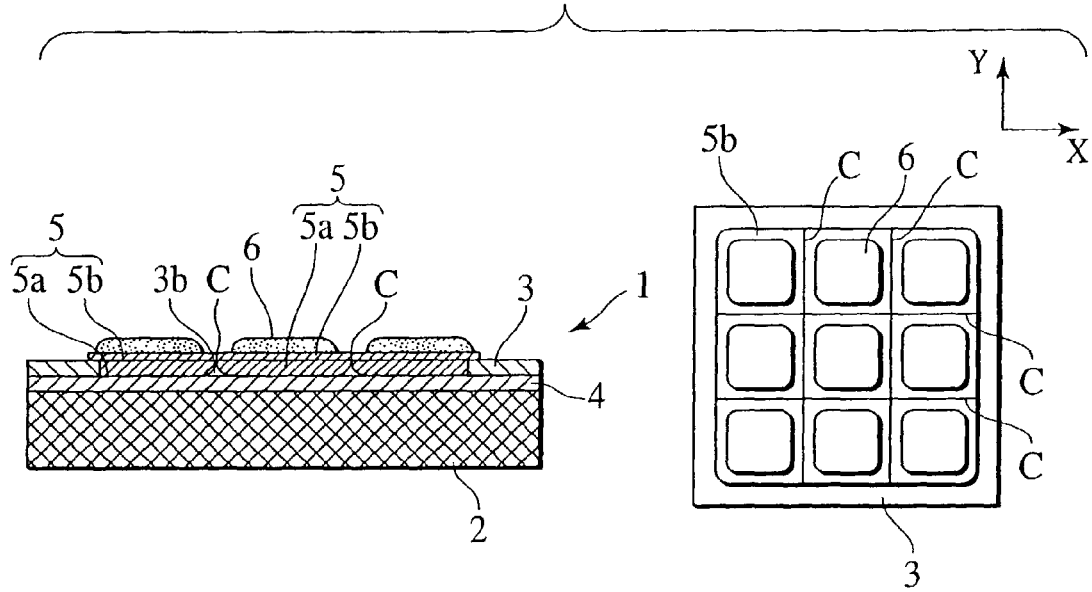
FIG. 3 shows a cross sectional view and a plan view for illustrating a cell plate structure for a fuel cell of a third example of the preferred embodiment according to the present invention which allows cracks to be caused in an electrolyte layer during a baking step to form a plurality of divided electrolyte regions, in which the cross sectional view is illustrated at the left side of this FIG. 3 and the plan view is illustrated at the right side of this FIG. 3, respectively.

And, such a solid electrolyte layer 5 may be formed by a patterning technique as shown in FIGS. 1A to 1E. Also, as shown in FIG. 3, the solid oxide electrolyte layer 5 may be formed at an entire surface thereof and, subsequently, may be formed into divided electrolyte regions by causing cracks at given locations. That is, the porous substrate 2 may be formed with the porous impermeable layer 3 by controlling edge shapes and differential thermal expansion rates and then formed with the solid electrolyte layer 5 in a dry type film forming method such as sputtering or thermal spraying method, whereupon the solid oxide electrolyte layer 5 may be subjected to heat treatment to cause cracks at preselected positions thereof.

In the cell plate structure 1 for the fuel cell of the preferred embodiment, as shown in FIGS. 1A to 1E, an upper surface of the gas impermeable layer 3 and an upper surface of the lower electrode layer 4 are formed in a substantially coplanar surface. The presence of such coplanar surface allows the gas impermeable layer 3 and the lower electrode layer 4 to be formed in less difference in level, with a tendency in that the solid electrolyte layer 5 is formed on a smooth surface in a thin film with less difference in level. Thus, the electrolyte layer may be formed in the film state by selecting various conditions that enable formation of a dense electrolyte layer. As a result, the solid oxide electrolyte layer 5 has a reduced thickness to enable reduction in loss in electric power output while maintaining a highly reliable gas shielding property.

Further, in an alternative technique, as shown in FIGS. 2A to 2D, both upper surfaces of the gas impermeable layer 3 and the solid electrolyte layer 5 are formed in a substantially, coplanar plane using a printing technique, a paste coating technique or a thermal spraying technique, providing a capability of obtaining the electrolyte layer formed by patterning executed in a simple and highly precise fashion for thereby providing superior advantages in productivity and durability.

As shown in FIG. 3, furthermore, the solid electrolyte layer 5 may comprise a lower surface layer 5a and an upper surface layer 5b to cause the lower surface of the gas impermeable layer 3 and the lower surface layer 5a of the solid electrolyte 5 to be aligned in a substantially coplanar plane while the upper surface layer 5b of the solid electrolyte layer 5 protrudes above the upper surface of the gas impermeable layer 3. Thus, even in a case where the gas impermeable layer 3 has electrical conductivity, the cell plate structure of the preferred embodiment has an excellent productivity while enabling an electrical leakage from being reliably prevented between the upper electrode layer 6 and the lower electrode layer 4.

Besides, in the cell plate structure 1 for the fuel cell of the preferred embodiment, the porous substrate 2 may have an electrical insulating property and the gas impermeable layer 3 may have an electrical conductivity. In such a case, the gas impermeable layer 3 bears to have a current collecting function in the cell plate structure 1 which tends to cause the electrolyte layer to have a reduced surface area from which current collection is to be performed, with a resultant ability to allow the amount of gas to be supplied at an increased flow rate while enabling the formation of the electrode layer having an increased porosity without increasing electrical resistance during current collection for thereby providing an improved electric power generating efficiency.

Figure 9:
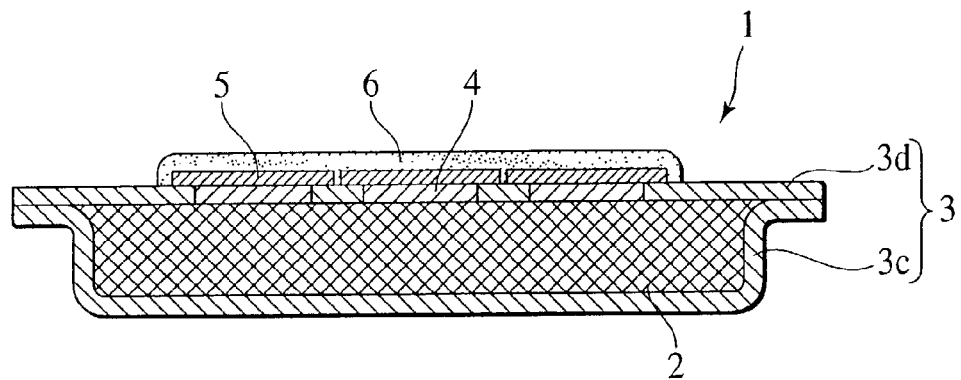
FIG. 9 shows a cross sectional view of a cell plate structure for a fuel cell of a ninth example of the preferred embodiment according to the present invention, with the cell plate structure employing a porous substrate whose side surface and rear surface are formed with an electrically conductive gas impermeable layer.

As shown in FIG. 9, further, the gas impermeable layer 3 may also be formed not only on the surface on which the solid electrolyte layer 5 is formed but also on a side and rear surfaces of the porous substrate 2. With such an alternative technique, when laminating a plurality of cell plate structures 1 in a stacked structure, the presence of the electrically conductive gas impermeable layer 3e formed on the side surface and the rear surface of the substrate allows the plural cell plate structures 1 to be electrically conducted to one another to provide a simplified stacked structure while decreasing electrical-connection loss to improve electrical power generating efficiency. In addition; forming the gas impermeable layer 3e on the upper, side and rear surfaces of the substrate 2 with the same material enables a gas shielding property to be improved with a resultant further improvement in the electrical power generating efficiency.

Moreover, in the cell plate structure 1 for the fuel cell of the preferred embodiment, as shown in FIG. 5, the porous substrate 2 may have an electrical conductivity, and at least a surface, on which the solid electrolyte layer 5 is formed, of the gas impermeable layer 3 may have an electric insulating property. In such a case, the porous substrate 2 bears to have a current collecting function in the cell plate structure 1 and, in general, since the upper electrode layer 6 has a high porosity, it is possible for the thermal shock to be effectively alleviated without the need for patterning formation for thereby providing a simplified fabrication procedure.

Figure 6:
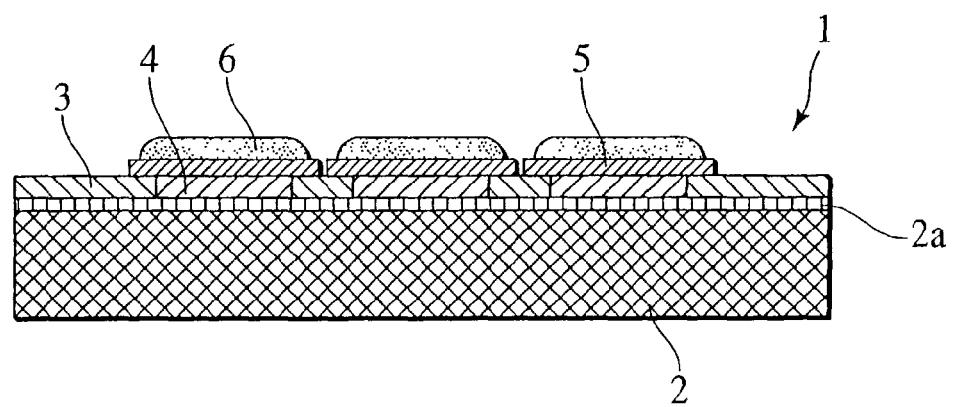
FIG. 6 shows a cross sectional view of a cell plate structure for a fuel cell of a sixth example of the preferred embodiment according to the present invention, with the cell plate structure employing a porous substrate formed in a two-layer structure.

Further, of course, both the porous substrate 2 and the gas impermeable layer 3 may be made of metal, with a resultant improved durability in a joined portion between the porous substrate 2 and the gas impermeable layer 3. In this instance, as shown in FIG. 6, an electrically insulating layer may be formed on the surface of the metallic porous substrate 2 by a thermal spraying technique or a thermal oxidizing technique, or the electrically insulating layer 2a may be formed on at least the surface, on which the solid electrolyte layer 5 is formed, of the gas impermeable layer 3 by forming or depositing a metallic film on a lower surface of an electrically insulating foil, i.e. to provide the porous substrate 5 in a so-called two-layer structure. As such, the electrically conductive portion of the gas impermeable layer 3 plays a roll as the current collecting function without the need for patterning formation of the upper electrode 6 resulting in a simplified fabrication step.

Figure 10:
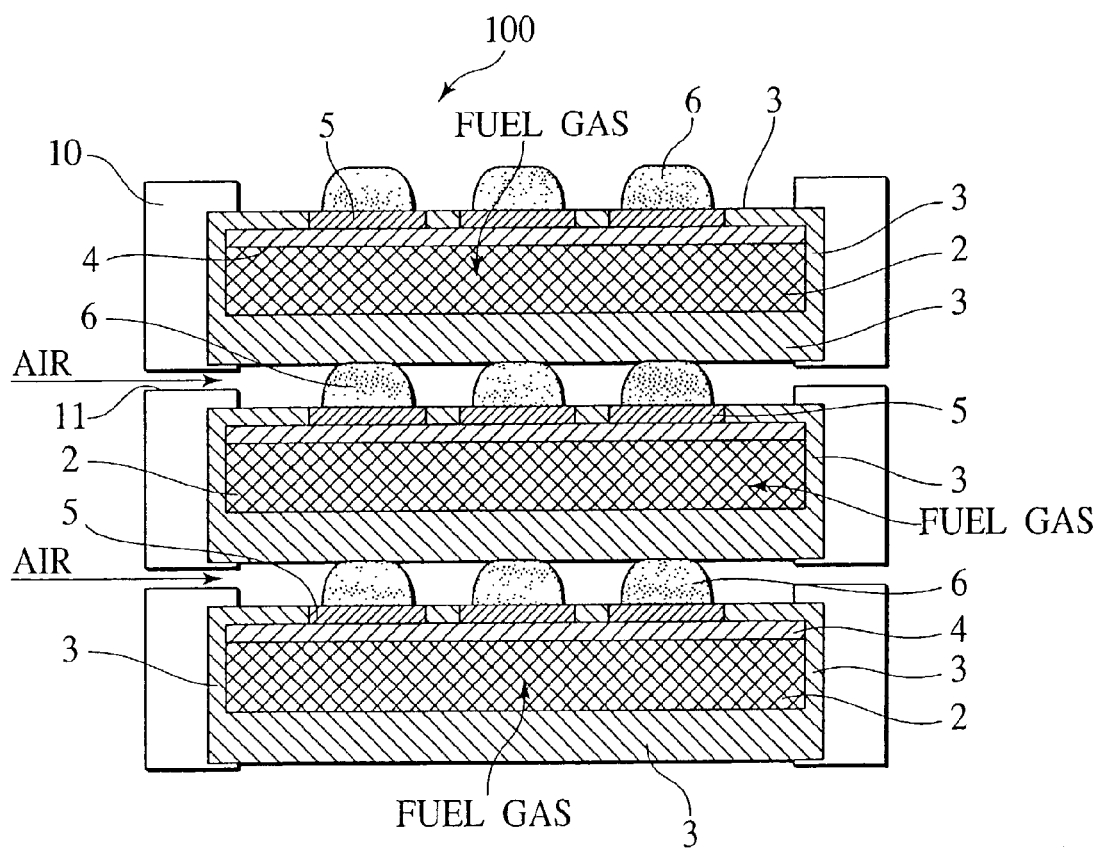
FIG. 10 shows a cross sectional view of a fuel cell stack of a tenth example of the preferred embodiment according to the present invention.

Furthermore, as previously set force above, the gas impermeable layer 3 may be formed on not only on the surface, on which the solid electrolyte layer 5 is formed, of the porous substrate 2 but also on the side surface and the rear surface side thereof and, in this instance, another alternative may be undertaken in that the surface on which the solid electrolyte layer 5 is formed is made of electrically insulating material whereas the side and rear surfaces of the porous substrate 2 is made of a metallic foil. With such an alternative technique, as shown in FIG. 10, when laminating a plurality of the cell plate structures 1 in a stacked structure, the use of the electrically conductive gas impermeable layer 3 formed at the side and rear surfaces of the substrate 2 provides electrical connection between the cell plate structures, thereby reducing electrical-connection loss to provide an improved electrical power generating efficiency while providing a simplified stack structure.

In the cell plate structure 1 for the fuel cell of the preferred embodiment, also, as shown in FIG. 6, the porous substrate 2 may take the form of a two-layer structure that has a surface layer 2a different in porosity rate from the porous substrate 2. For example, the surface layer 2a, which serves as a filmed substrate, and the porous substrate 2, which serves as the gas flow passage, are formed to be separate from one another. That is, the surface layer 2a, on which the electrode layer and subsequently the solid electrolyte layer are formed in sequence, is selected to have a porous diameter and a reduced porosity rate taking priority over the filmed function as the substrate. In contrast, the remaining area of the substrate, wherein the surface layer 2a is absent, is selected to have a porous diameter and an increased porosity rate taking priority over the gas dispersing function. Thus, it is possible for the electrode layer and the solid electrolyte layer to be formed in respective desired qualities without sacrificing the amount of gas to be supplied, thereby improving an electric power generating efficiency.

In the cell plate structure 1 for the fuel cell of the preferred embodiment, moreover, as shown in FIG. 6, the surface layer 2a of the porous substrate 2 may have a function as the lower electrode such that the surface layer 2a may also serve as the so-called lower electrode layer. Thus, there is no need for forming the upper electrode layer in a film shape by patterning while providing an ease of establishing electrical connection between the adjacent cell plate structures in a case where these components are laminated in a stack structure. In this instance, the surface layer 2a of the substrate 2 that acts as the lower electrode layer may be comprised of LSM, LSC, Ag, etc. in case of serving as the air electrode or may be comprised of Ni cermet, etc. in case of serving as the fuel electrode, correspondingly.

Now, a manufacturing method for the cell plate structure for the fuel cell of the preferred embodiment comprises a step A for forming a gas impermeable layer 3 on a porous substrate 2, a step B for forming a lower electrode layer 4 on the gas impermeable layer 3, a step C for forming a solid electrolyte layer 5 on the lower electrode layer by a patterning procedure, and a step D for forming an upper electrode layer 6 on the solid electrolyte layer 6. Here, the step A may be initiated prior to the step B to form the lower electrode layer 4 at areas, which is not formed with the gas impermeable layer 3, of the porous substrate 2 by patterning. In an alternative way, the step A may be implemented between the steps B and C to form the solid electrolyte layer 5 by patterning in a plurality of divided small areas. This allows the component parts to be formed in sintered bodies of thin plate, with a resultant capability in performing mass production of the cell plate structure 1 for the fuel cell at a high productivity.

In such an instance, the step A for forming the gas impermeable layer 3 on the porous substrate 2 may be performed by a first technique for affixing a glass thin plate or a metallic foil to the porous substrate 2 using adhesive, a second technique for directly jointing the metallic foil to the porous substrate 2 using a diffusion joint method or a welding method, a third technique for forming a film using a dry type film forming method such as a thermal spraying method, a fourth technique using a paste applying and sintering method and a fifth technique using a wet type film forming method such as a sol-gel method.

Further, the steps B, C and D for forming the lower electrode layer 4, the solid electrolyte layer 5 and the upper electrode layer 6 may be achieved in a film forming method such as a sputtering method, an evaporating method, a PVD method such as a laser abrasion method, a plasma splaying method, a paste coating method and a sol-gel method. Furthermore, in steps B and C, the electrolyte layer 5 of a thin plate of a sintered body may be affixed with paste containing the lower electrode material, and a subsequent step of baking with heat causes the lower electrode layer 4 and the solid electrolyte layer 5 to be formed.

Besides, when forming the lower electrode layer 4 in step B, it may be possible to adopt the film-forming step for forming the lower electrode 4 in a film shape and a surface grinding step for grinding the lower electrode layer which is formed in the film shape. As such, although a fine patterning procedure can not be realized, the use of the thermal spraying method excellent in productivity allows the films to be formed by pattering at an increased yield rate for thereby improving the productivity and the heat shock resistance property.

In such an instance, the step B for forming the lower electrode layer may be performed in a plurality of film forming steps using a technique for forming a film by sputtering after the formation of film by a thermal spraying method or a technique for forming a film by an ion-plating method after the formation of film by a paste coating and baking method.

Furthermore, in the steps B and C, the lower electrode layer 4 and the solid electrolyte layer 5 may be formed by implementing a procedure comprised of a step for laminating the porous substrate 2, carrying thereon the gas impermeable layer 3, and the solid electrolyte layer 5, formed on a temporary substrate 7, with a lower electrode layer material 4 having a joining function and a step for removing the temporary substrate 7 from the solid electrolyte layer 5. Thus, the use of the temporary substrate 7 having a superior flatness allows the solid electrolyte layer 5 to be formed in a thin film in a dense condition, resulting in a reduction in loss of electrical power output due to decreased internal resistance of the solid electrolyte layer 5.

With such a procedure, the temporary substrate 7 may be preferably made of material, having a surface flatness property suited for forming the electrolyte layer in a dense thin film, such as a glass plate or a ceramic plate. Also, a technique for removing the temporary substrate 7 after the solid electrolyte layer 5 has been laminated with the lower electrode layer material 4 may involve etching treatment using acids or alkalines or heat treatment to cause the electrolyte layer 5 to be peeled off from the temporary substrate 7. In addition, after the formation of the electrolyte layer 5 on the temporary substrate 7, surface treatment may also be carried out to form a film of a layer containing the lower electrode layer material with a view to further improving an adhesion property with respect to an adhesion agent of the lower electrode layer material 4 or with a view to reducing resistance in an interfacial reaction.

Now, in order to describe the present invention more in detail, various examples (EXAMPLE 1 to EXAMPLE 11) are discussed below with reference to the drawings.

EXAMPLE 1

FIGS. 1A to 1E are cross sectional views and related plan views for sequentially illustrating manufacturing steps for the cell plate structure 1 for the fuel cell of the first example (EXAMPLE 1) of the preferred embodiment according to the present invention, with the cross sectional views bearing at the left sides of these drawings while the plan views are illustrated at the right sides of these drawings, respectively.

In the cell plate structure 1 for the fuel cell of the preferred embodiment, initially as shown in FIG. 1A, a Ni foil of a thickness of 10 μm was brazed as a gas impermeable layer 3 onto a porous metallic substrate 2 made of SUS material (stainless steel) with a thickness of 2 mm, a porosity rate of 70% and an average pore diameter of 5 μm using Ni-base alloy brazing paste. Also, the Ni foil 3 was preliminarily formed with a plurality of bores 3a with a diameter of 4 mm.

Figure 1B:
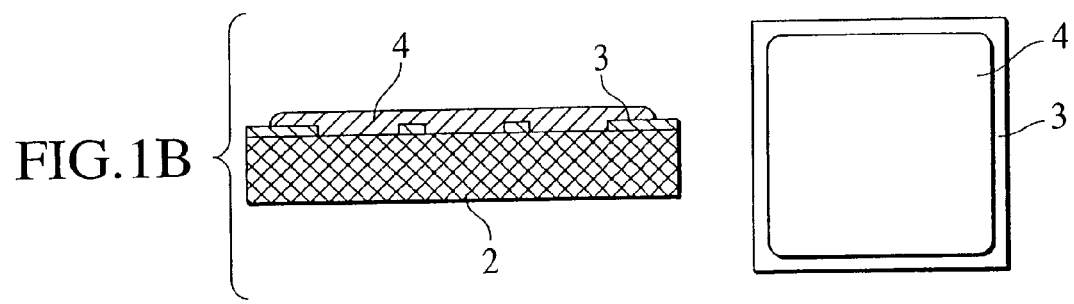

Subsequently, as shown in FIG. 1B, a Ni layer serving as the lower electrode layer 4 was formed on the gas impermeable layer 3, brazed onto the porous substrate 2, to have a thickness of 50 μm by a plasma thermal spraying method.

Figure 1C:
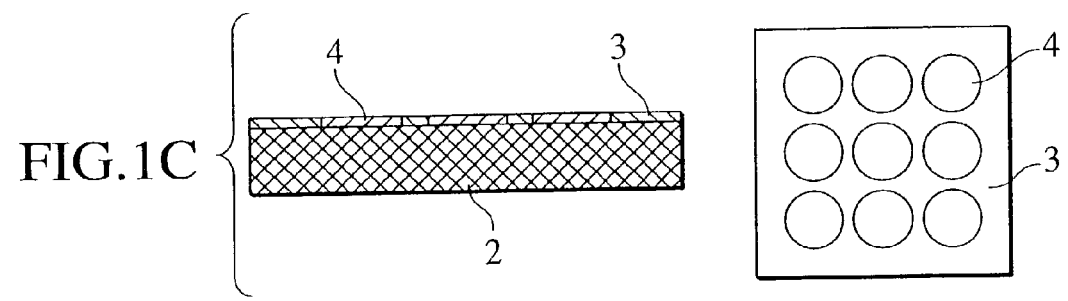

Then, as shown in FIG. 1C, the surface of the Ni layer serving as the lower electrode layer 4 was grounded until a pattern of the gas impermeable layer 3 appeared. In this instance, the grounded surface was maintained at a surface roughness in the order of mirror finish.

Figure 1D:
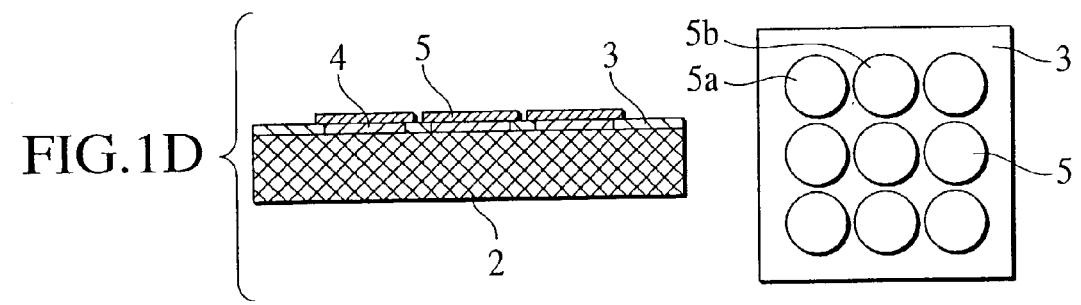

Consecutively, as shown in FIG. 1D, the solid electrolyte layer 5 is formed on an upper surface of the gas impermeable layer 3 and an upper surface of the lower electrode 4, which have a substantially coplanar surface formed by grinding. Sputtering YSZ (partially stabilized zirconia added with yttria) was carried out by selectively conditioning the solid electrolyte layer 5 with a pattern including selected areas conditioned to form divided film areas of electrolyte layer and non-selected areas to which the solid electrolyte layer did not adhere, with the divided film areas covering an entire surface of the lower electrode layer. At this instant, resulting film of the electrolyte layer 5 had a thickness of 3 μm.

Figure 1E:
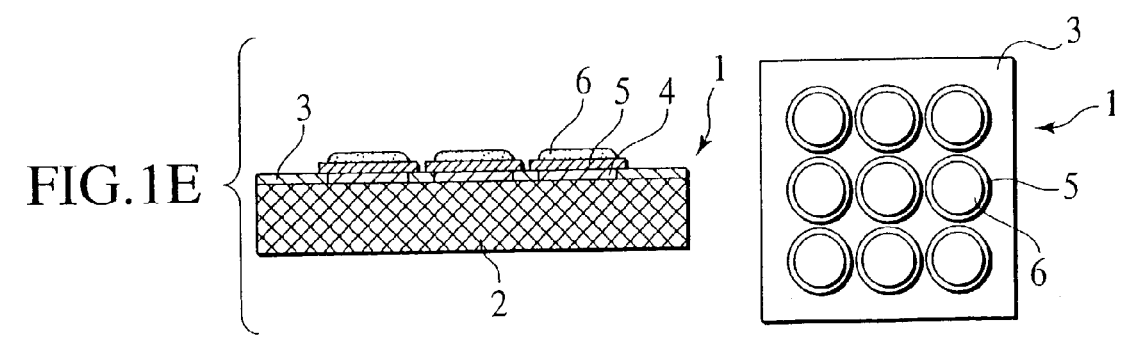

Finally, as shown in FIG. 1E, LSM was formed on the electrolyte layer 5 in a pattern not to stick out the electrolyte layer 5 by sputtering to have a film thickness of 5 μm to form an upper electrode layer 6, thereby obtaining the cell plate structure 1 for the fuel cell.

With the structure discussed above, it was confirmed that it was possible to manufacture the cell plate structure 1 for the fuel cell having a dense solid electrolyte 5 formed above the porous substrate 2 to have a film thickness of 3 μm while the electrolyte 5 acts as a gas barrier wall and has low IR resistance.

And, the resulting cell plate structure 1 for the fuel cell was assembled into a cell plate evaluating device to allow air and hydrogen gas to be introduced to the upper electrode layer 6 and the porous substrate 2, and electrical power output was measured at a temperature of 700° C. to reveal power output of 0.2 W/cm². Further, while monitoring electrical power output of the cell plate structure 1 for the fuel cell in the cell plate evaluating device, evaluation was conducted to evaluate heat-shock resistant property by repeatedly lowering and raising the cell plate temperature number of times at a rate of 200° C./Hr within a temperature range between from 700 to 200° C. As a result, the presence of reduction in power output was not entirely observed even in a case of lowering and raising the cell plate temperature ten times.

EXAMPLE 2

FIGS. 2A to 2D are cross sectional views and related plan views for sequentially illustrating manufacturing steps for the cell plate structure 1 for the fuel cell of the second example (EXAMPLE 2) of the preferred embodiment according to the present invention, with the cross sectional views bearing at a left side of the drawings while the plan views are illustrated in right side.

Figure 2A:
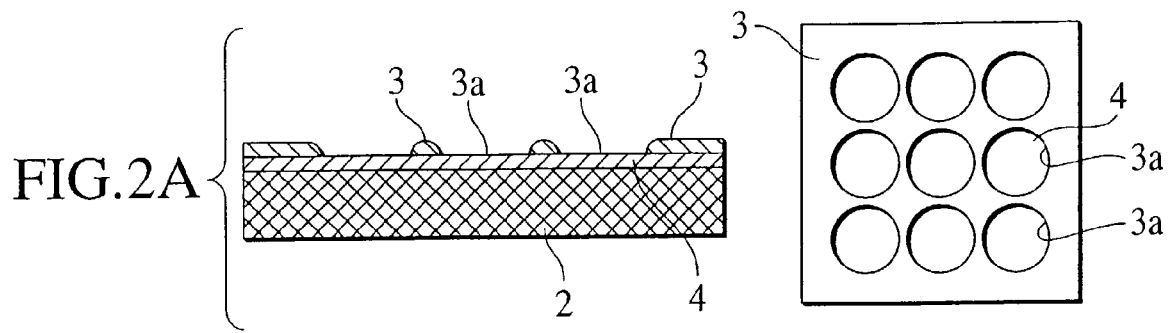
FIGS. 2A to 2D show cross sectional views and plan views for sequentially illustrating a manufacturing process for a cell plate structure for a fuel cell of a second example of the preferred embodiment according to the present invention, in which the cross sectional views are illustrated at the left sides of these FIGS. 2A to 2D and the plan views are illustrated at the right sides of these FIGS. 2A to 2D, respectively.

In the cell plate structure 1 for the fuel cell of this EXAMPLE, initially as shown in FIG. 2A, a film of LSM having a thickness of 30 μm and serving as a lower electrode layer 4 was formed over an entire surface of a porous substrate 2 made of zirconia with a thickness of 2 mm, the pore rate of 40% and an average pore diameter of 2 μm by plasma spraying method. And, a Ni foil was brazed onto the lower electrode layer 4 as a gas impermeable layer 3 using Ni-base alloy brazing paste added with Ti. Also, the Ni foil 3 was preliminarily conditioned to have a pattern including a plurality of bores 3a with a diameter 10 mm.

Figure 2B:
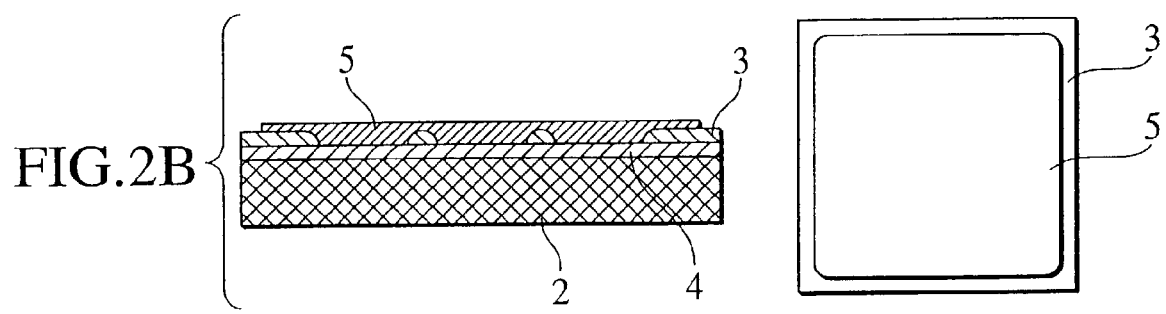

As shown in FIG. 2B, subsequently, a paste including cerium composition and glass frit in the order of average particle size of 0.5μ was coated over the gas impermeable layer 3 brazed onto the lower electrode layer 4 and thereafter baked at 1000° C. to form a solid electrolyte layer 5.

Figure 2C:
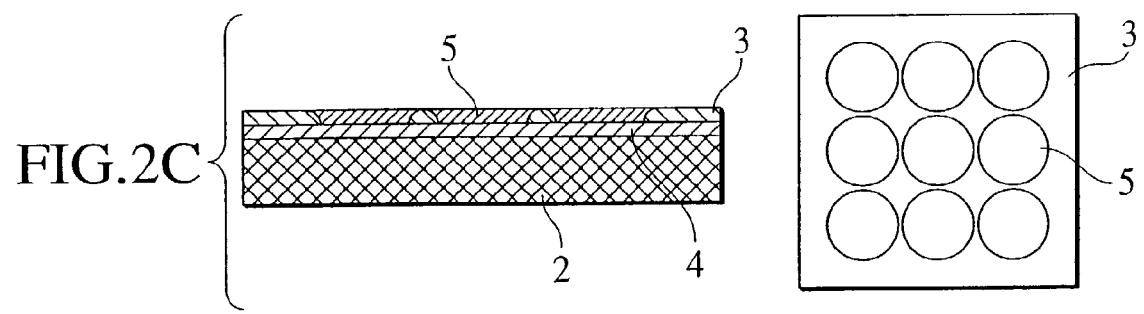

Then, as shown in FIG. 2C, a surface of the solid electrolyte layer 5 was ground such that the gas impermeable layer 3 appeared. The grounding procedure was completed in surface roughness with higher degree such as so-expressed VVfinish.

Figure 2D:
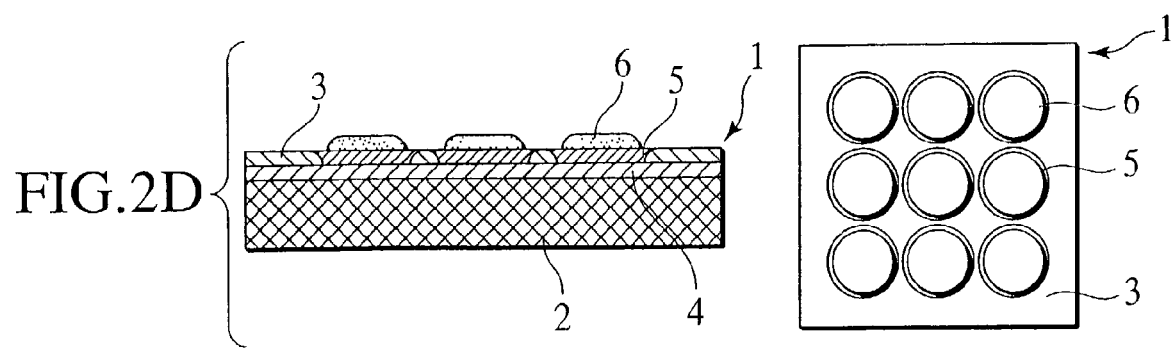

As shown in FIG. 2D, finally, a Ni layer was formed on upper surfaces of the gas impermeable layer 3 and the electrolyte layer 5, finished in a substantially coplanar surface by grounding, by sputtering to form an upper electrode layer 6 in a thin film of a thickness 10 μm in a pattern not to stick out from the electrolyte layer 5, obtaining the cell plate structure 1 for the fuel cell.

With the structure produced in EXAMPLE 2, like the resulting cell plate structure 1 for the fuel cell produced in EXAMPLE 1, it was confirmed that it was possible to manufacture the cell plate structure 1 for the fuel cell having a dense solid electrolyte 5 formed above the porous substrate 2 in a film thickness of 3 μm which electrolyte acts as a gas barrier wall and has low IR resistance. Evaluating the resulting cell plate structure by assembling it to the cell plate evaluating device confirmed the presence of a practically adequate amount of electrical power output and a heat-shock resistant property.

EXAMPLE 3

FIG. 3 is a cross sectional view and a related plan view for illustrating a cell plate structure 1 for the fuel cell of the third example (EXAMPLE 3) of the preferred embodiment according to the present invention, with the cross sectional views bearing at the left side of this drawing while the plan view is illustrated at the right side of this drawing.

The cell plate structure 1 of this EXAMPLE was similar to the cell plate structure 1 for the fuel cell produced in EXAMPLE 2 in that a lower electrode layer 4 was formed on an entire surface of a porous substrate 2 and a gas impermeable layer 3 was formed on the lower electrode layer 4, but was different from EXAMPLE 2 in that the gas impermeable layer was designed to have a profile with sharp edges in cross section. That is, the presence of the gas impermeable layer 3 formed with the sharp cross sectional shape appearing in EXAMPLE 3 caused cracks to be created into divided pieces at desired areas in a given pattern in the solid electrolyte layer 5 during baking step of the same, with such a difference being focused and described below in detail.

In particular, the gas impermeable layer 3 having partition walls each formed with the upwardly facing sharp edges in cross section was formed on the lower electrode layer 4 in the given pattern and thereafter the solid electrolyte layer 5 was formed on the gas impermeable layer 3 in the same manner as in EXAMPLE 2. Here, the gas impermeable layer 3 had its lower surface aligned with the lower surface of the solid oxide layer 5a in a substantially coplanar plane.

In next step, grinding carried out for grinding the surface of the solid electrolyte layer 5a formed on the gas impermeable layer 3 until the gas impermeable layer 3 appeared.

Subsequently, the electrolyte layer 5b was formed on upper surfaces, which were aligned in a substantially coplanar plane, of the gas impermeable layer 3 and the solid electrolyte layer 5a such that the electrolyte layer 5b stuck out from the gas impermeable layer 3 and baked at a temperature of 1000° C., causing cracks to be formed at regions C to divide the solid electrolyte layer 5b into a plurality of patterned electrolyte regions. In this EXAMPLE, while the plural cracks C were caused along lines parallel to X- and Y-axes shown in the plan view at the right side of FIG. 3, respectively, the present invention is not limited thereto and a modification or alternation may be possible to allow the cracks to be suitably caused in a desired pattern of the solid electrolyte layer 5b to be divided.

Finally, forming the film of the upper electrode layer 6 in a pattern wherein the upper electrode layer 6 does not stick out from the electrolyte layer 5b divided by the cracks C enables the cell plate structure 1 for the fuel cell to be obtained.

With the resulting cell plate structure 1 for the fuel cell discussed above, especially, the presence of the electrolyte layer 5b that sticks out over the gas impermeable layer 3 reliably precludes electrical leakage from occurring between the upper electrode layer 6 and the lower electrode layer 4.

EXAMPLE 4

Figure 4:
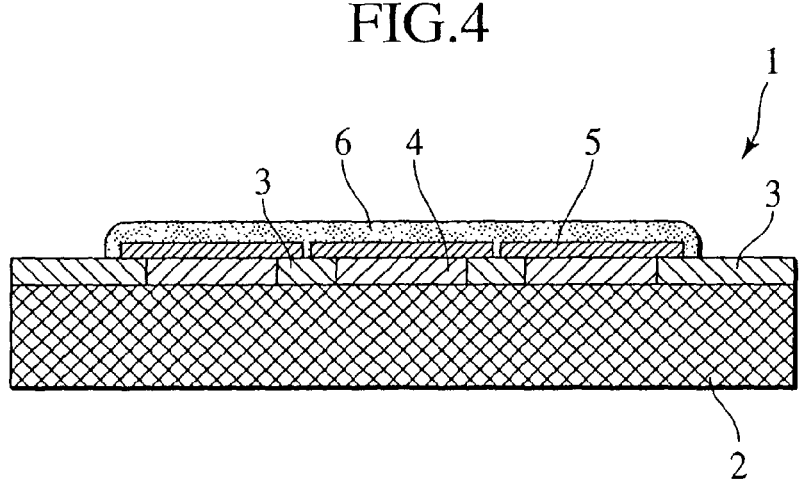
FIG. 4 shows a cross sectional view of a cell plate structure for a fuel cell of a fourth example of the preferred embodiment according to the present invention, with the cell plate structure employing an electrically insulating gas impermeable layer.

FIG. 4 is a cross sectional view of a cell plate structure 1 for a fuel cell of the fourth example (EXAMPLE 4) of the preferred embodiment according to the present invention.

The cell plate structure 1 for the fuel cell of this EXAMPLE has the same fundamental structure as that of EXAMPLE 1, but is different in structure in that during forming step of the upper electrode layer 6, a patterning procedure is excluded, with such a difference being focused and described below in detail.

In particular, when manufacturing such a cell plate structure 1 for the fuel cell, an electrically insulating gas impermeable layer 3 was formed on a porous substrate 2 by affixing a glass thin plate or by thermally spraying ceramics such as alumina to provide electrically insulating property.

Subsequently, the lower electrode layer 4 and the solid electrolyte layer 5 were formed in a sequence in the same procedure as in EXAMPLE 1.

Finally, the upper electrode layer was formed in the same procedure of EXAMPLE 1 and, in such method, patterning of the upper electrode layer 6 was not undertaken with an outer periphery of the upper electrode layer 6 simply covering the gas impermeable layer 3.

With the resulting cell plate structure 1 for the fuel cell described above, especially, there is no need for implementing patterning step during formation of the upper electrode layer 6 while enabling to obtain an adequate degree of heat-shock resistant property with the exception wherein the upper electrode layer 5 has a particularly low porosity rate, resulting in a simplified manufacturing process.

EXAMPLE 5

FIG. 5 is a cross sectional view of a cell plate structure 1 for a fuel cell of the fifth example (EXAMPLE 5) of the preferred embodiment according to the present invention.

The cell plate structure 1 for the fuel cell of this EXAMPLE has the same fundamental structure as that of EXAMPLE 4, but is different in that a gas impermeable layer 3 is modified in a detailed structure, with such a difference being focused and described below in detail.

In particular, when manufacturing such a cell plate structure 1 for the fuel cell, a metallic foil was adhered to the porous substrate 2 as an electrically conductive gas impermeable layer 3b.

Subsequently, an insulating layer 3c was formed on such an electrically conductive gas impermeable layer 3b. At least a surface, which born contact with the upper surface layer 6, of such an insulating layer 3c is required to be treated to have electrical insulation and insulation treatment may be conducted preferably by forming a thin film using insulation material such as plastic resin or by baking the gas impermeable layer 3 per se in an oxidizing atmosphere to form an oxidized layer that serves as the insulating layer 3c. Thus, the gas impermeable layer 3 included the gas impermeable layer 3b, made of metallic foil, and the insulating layer 3c.

And, subsequent steps were carried out in the same manner as in EXAMPLE 4, allowing a lower electrode layer 4, a solid electrolyte layer 5 and an upper electrode layer 6 to be formed in a sequence.

With the resulting cell plate structure 1 for the fuel cell described above, especially, the metallic foil 3b of the gas impermeable layer 3 exhibits a current collecting function while, on the other hand, excluding the need for carrying out the patterning step for the upper electrode layer 6 as in EXAMPLE 4, resulting in a capability of simplifying the manufacturing process.

EXAMPLE 6

FIG. 6 is a cross sectional view of a cell plate structure 1 for a fuel cell of the sixth example (EXAMPLE 6) of the preferred embodiment according to the present invention.

The cell plate structure 1 for the fuel cell of this EXAMPLE has the same fundamental structure as that of EXAMPLE 1, but is different in that a porous substrate 2 is modified in a detailed structure, with such a difference being focused and described below in detail.

In particular, when manufacturing such a cell plate structure 1 for the fuel cell, the porous substrate 2 may have a surface formed with a surface layer 2a that is made of material different from that of the lower electrode layer 5, a surface layer 2a having a different porosity rate or a surface layer 2a that is able to serve as the lower electrode layer.

And, subsequent steps were carried out in the same manner as in EXAMPLE 1, allowing a gas impermeable layer 3, a lower electrode layer 4, a solid electrolyte layer 5 and an upper electrode layer 6 to be formed in a sequence.

With the resulting cell plate structure 1 for the fuel cell described above, especially, the presence of the porous substrate 2 composed of such a multi-layer structure allows the porous substrate to have various functions required for the same, i.e. a film forming function for allowing the electrode layers and the solid electrolyte layer to be formed, a function for collecting current from the electrodes and an interconnector function to provide an ability for distinguishing the rise of available physical properties suited for such respective functions. This results in an increased design freedom and an improved electrical power generating efficiency.

EXAMPLE 7

FIGS. 7A to 7D are cross sectional views for sequentially illustrating manufacturing steps for the cell plate structure 1 for the fuel cell of the seventh example (EXAMPLE 7) of the preferred embodiment according to the present invention.

The cell plate structure 1 for the fuel cell of this EXAMPLE has the same fundamental structure as that of EXAMPLE 6, but is different in that the upper electrode layer 6 was formed without the patterning process.

Figure 7A:
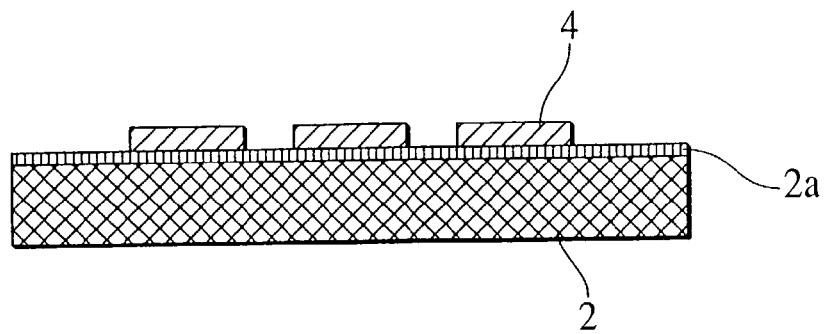
FIGS. 7A to 7D show cross sectional views for sequentially illustrating a manufacturing process of a cell plate structure for a fuel cell of a seventh example of the preferred embodiment according to the present invention.

Initially, as shown in FIG. 7A, an entire surface of a porous substrate 2, made of a sintered body of metallic particles (Ni-16Cr-8Fe) with a thickness of 2 mm, a porous diameter of 250 µm and a porous rate of 92% was formed with a surface layer 2a in a thin film with a thickness of 50 µm, a porous diameter of 5 µm and a porosity rate of 50%. Thereafter, a thin film was formed over the surface layer 2a in a patterning-printing process using Ni-base paste and baked at a temperature of 1000° C. to form a lower electrode layer 4.

Figure 7B:
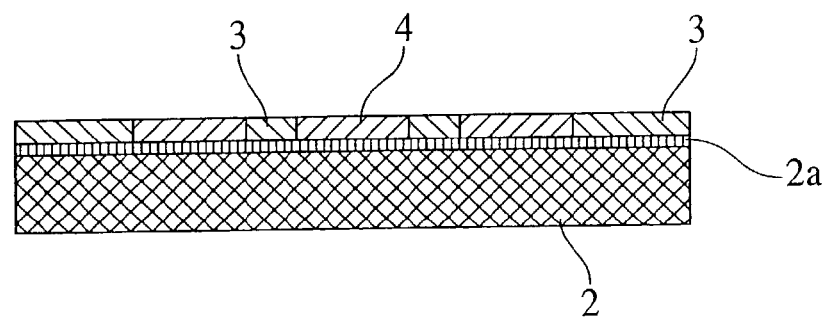

Subsequently, as shown in FIG. 7B, plasma spraying of alumina was carried out to form a gas impermeable layer 3 onto the lower electrode layer 4 and thereafter the gas impermeable layer 3 was ground to an extent to cause the lower electrode layer 4 to appear.

Figure 7C:
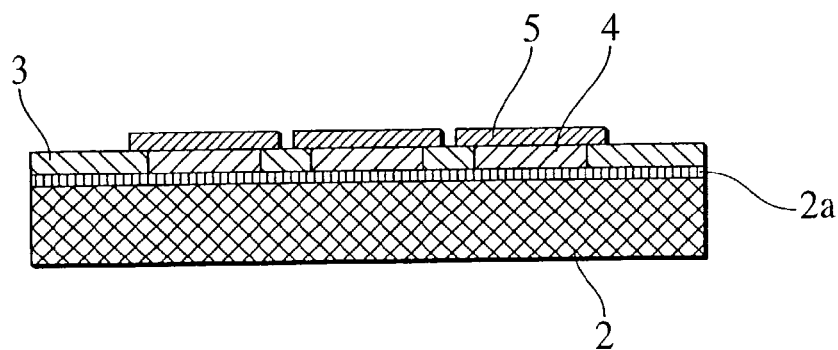

In next step, as shown in FIG. 7C, a thin film was formed to completely cover the lower electrode layer 4 by sputtering to provide a solid electrolyte layer 5 in the same divided pattern as that discussed above.

Figure 7D:
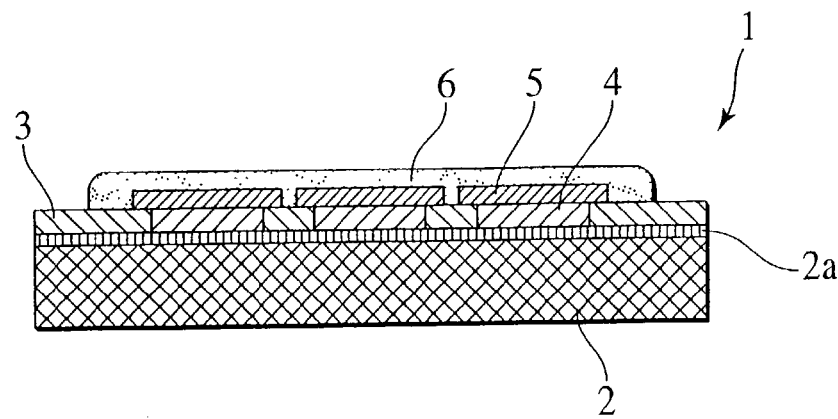

Finally, as shown in FIG. 7D, a thin film of an upper electrode layer 6 was formed on the solid electrolyte layer 5 in a desired pattern by sputtering in the same way, obtaining the cell plate structure 1 for the fuel cell.

With the resulting cell plate structure 1 for the fuel cell obtained in such a process, the cell plate structure 1 has the same advantages as in that of EXAMPLE 6 and has no need for the upper electrode layer 6 to be formed in the patterning process, resulting in a capability in simplifying the manufacturing process.

EXAMPLE 8

FIGS. 8A to 8E are cross sectional views for sequentially illustrating manufacturing steps for the cell plate structure 1 for the fuel cell of the eighth example (EXAMPLE 8) of the preferred embodiment according to the present invention.

The cell plate structure 1 for the fuel cell of this EXAMPLE has the same fundamental structure as that of EXAMPLE 1, but is different principally in that the temporary substrate 7 was employed, with such a difference being focused and described below in detail.

Figure 8A:
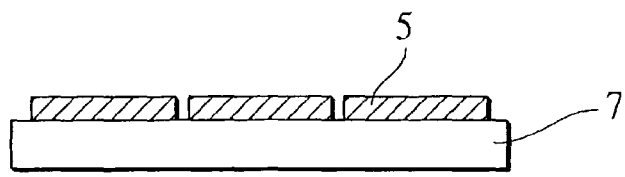
FIGS. 8A to 8E show cross sectional views for sequentially illustrating a manufacturing process of a cell plate structure for a fuel cell of an eighth example of the preferred embodiment according to the present invention.

Initially, as shown in FIG. 8A, a quartz plate finished with a mirror surface was used as the temporary substrate 7, on which the solid electrolyte layer 5 was subjected to the patterning process and formed by sputtering in a thin film of a thickness of 3 μm. In this instance, in place of the sputtering method, it may be possible to form the film by a sol-gel method.

Figure 8B:
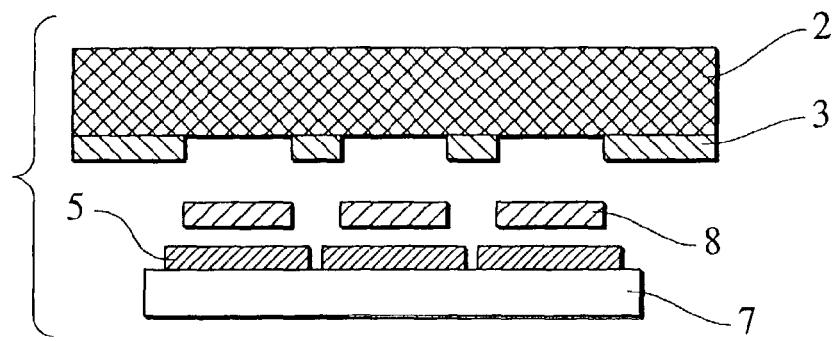

On one hand, as shown in FIG. 8B, a porous substrate 2 formed with a gas impermeable layer 3 in the same manner as that of EXAMPLE 1 was prepared, with the temporary substrate 7 formed with the solid electrolyte layer 5 in the film form and the porous substrate 2 being placed in opposed relationship via Ni-base alloy paste 8 that became a lower electrode layer 4.

Figure 8C:
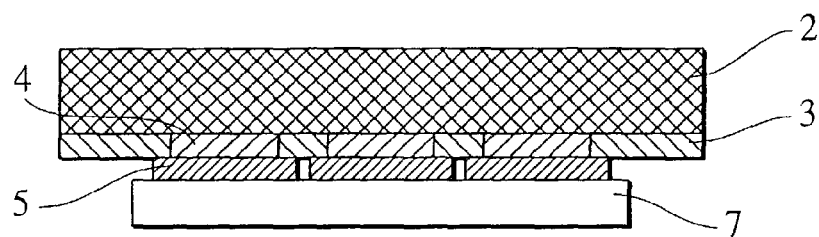

In next step, as shown in FIG. 8C, the Ni-base alloy paste 8 was buried in non-selected areas wherein the gas impermeable layer 3 was not formed on the porous substrate 2, with the paste 8 of the electrode material being used as a joint layer to allow the solid electrolyte layer 5 formed on the temporary substrate 7 to be affixed onto the porous substrate 2 whereupon baking was carried out at a temperature of 1000° C.

Figure 8D:
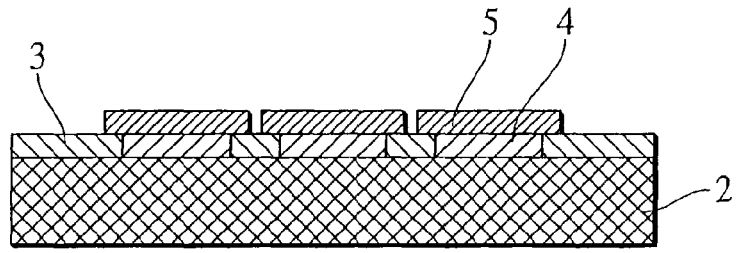

Following such baking step, as shown in FIG. 8D, the temporary substrate 7 was peeled off from the solid electrolyte layer 5 due to a difference in thermal expansion rates between the temporary substrate 7 and the electrolyte layer 5. In this instance, in order to lower the degree of adhesion between the temporary substrate 7 and the solid electrolyte layer 5 thereby to provide an ease of peeling off the temporary substrate 7 from the solid electrolyte layer 5, it is preferable for the temporary substrate 7 to be preliminarily coated with parting agent such as organic polymers. Alternatively, of course, the temporary substrate 7 may be immersed in acid solution to allow parting agent to be applied thereto.

Figure 8E:
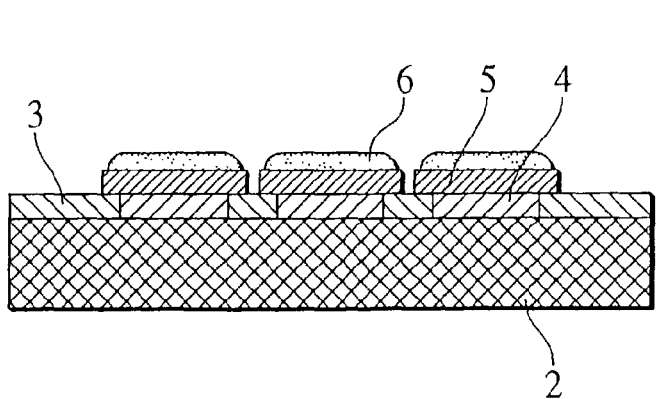

Finally, as shown in FIG. 8E, a thin film of an upper electrode layer 6 was formed on the solid electrolyte layer 5 in a desired pattern not to stick out therefrom by sputtering in the same way as that of EXAMPLE 1, obtaining the cell plate structure 1 for the fuel cell.

With the resulting cell plate structure 1 for the fuel cell obtained in such a process, the cell plate structure 1 has the same advantages as in that of EXAMPLE 1 and the presence of the electrolyte layer 5 formed on the temporary substrate 7 finished with the mirror surface allows the electrolyte layer 5 to be formed in a dense thin film, with a resultant reduction in loss of electric power output owing to IR resistance of the electrolyte.

EXAMPLE 9

FIG. 9 is a cross sectional view for illustrating the cell plate structure 1 for the fuel cell of the ninth example (EXAMPLE 9) of the preferred embodiment according to the present invention.

The cell plate structure 1 for the fuel cell of this EXAMPLE has the same fundamental structure as that of EXAMPLE 4, but is different in a detailed structure of the gas impermeable layer 3, with such a difference being focused and described below in detail.

In particular, in order to manufacture the cell plate structure 1 for the fuel cell of this EXAMPLE, the porous substrate 2 having electrical conductivity is formed with electrically insulating gas impermeable layer 3d in the same manner as that of EXAMPLE 4 and, thereafter, laminated with the lower electrode layer 4, the solid electrolyte layer 5 and the upper electrode 6 in sequence.

And, the side surface and the rear surface of the porous substrate 2 is formed with an electrically conductive gas impermeable layer 3e. Such an electrically conductive gas impermeable layer 3d and insulating gas impermeable layer 3e form the gas impermeable layer 3.

In such a resulting cell plate structure for the fuel cell, the electrically conductive porous substrate 2 bears a current collecting function in the cell plate structure, and the electrically conductive gas impermeable layer 3e formed on the side surface and the rear surface of the porous substrate 2 also serves to perform an electrically connecting function between the component parts of the cell plate structure, with a resultant increase in the degree of freedom to be applied to the fuel cell.

EXAMPLE 10

FIG. 10 is a cross sectional view illustrating a stack structure of a solid electrolyte type fuel cell (SOFC) 100 of the tenth example (EXAMPLE 10) of the preferred embodiment according to the present invention.

The SOFC 100 of this EXAMPLE includes a plurality of the cell plate structures 1 of the same structure as that of EXAMPLE 2, provided that the cell plate structure 1 is different in structure from that of EXAMPLE 2 in that the porous substrate 2 has not only the upper surface but also the side surface and the rear surface formed with the electrically conductive impermeable layer 3.

More particularly, the respective cell plate structures 1 for the fuel cell are laminated in such a manner that the upper electrode layer 6 and the electrically conductive gas impermeable layer 3 formed on the rear surface of the porous substrate 2 are held in contact in opposed relationship with respect to one another to totally provide the SOFC 100 in a stack structure. The resulting SOFC 100 includes side support members 10 each having a plurality of air intake ports 11 through which air is introduced to the upper electrode layers 6 while fuel gas is supplied to the lower electrode layers 4 via the porous substrates 2. Here, the electrically conductive gas impermeable layers 3 serve to separate gas, i.e. fuel, passing inside the porous substrate 2 and gas, i.e., air passing outside the porous substrate 2 from one another.

Also, the number of cell plate structures 1 for the fuel cell to be laminated is of course not limited to three pieces as shown and the cell plate structures 1 may be stacked in any number of pieces. Further, if desired, the cell plate structure 1 may be modified such that air is supplied to the lower electrode layer 4 while the upper electrode layer 6 is supplied with fuel gas.

In the resulting SOFC 100 thus obtained, the presence of the electrically conductive gas impermeable layer 3 formed on both the side surface and the rear surface of the porous substrate 2 compels it to be used for establishing electrical connection between the respective fuel-cell cell plate structures 1, enabling a stack structure to be obtained in a simple configuration.

EXAMPLE 11

Figure 11:
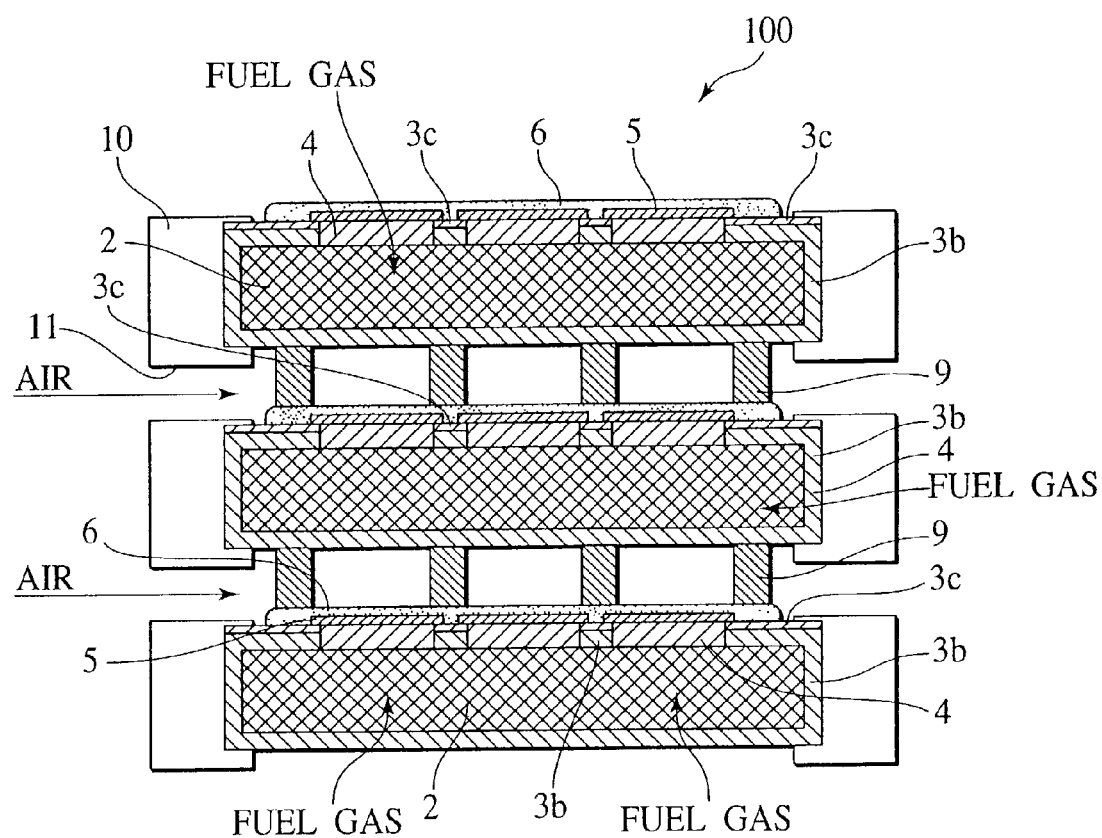
FIG. 11 shows a cross sectional view of a fuel cell stack of an eleventh example of the preferred embodiment according to the present invention.

FIG. 11 is a cross sectional view illustrating a stack structure of a solid electrolyte type fuel cell (SOFC) 100 of the eleventh example (EXAMPLE 11) of the preferred embodiment according to the present invention.

The SOFC 100 is comprised of a plurality of cell plate structures 1 for the fuel cell which has the same fundamental structures as that of EXAMPLE 5, provided that although the respective cell plate structures 1 for the fuel cell have the electrically conductive gas impermeable layer 3 composed of the electrically insulating layer 3c formed on the solid electrolyte layer 5 in the same structure as that of EXAMPLE 5, the gas impermeable layer 3b is formed not only on the upper surface of the porous substrate 2 but also on the side surface and rear surface thereof.

More particularly, the cell plate structures 1 for the fuel cell are laminated in sequence to form the SOFC 100 in a stack structure such that the upper electrode layer 6 and the rear surface of the porous substrate 2 are opposed to one another via interconnectors 9. The resulting SOFC 100 has support members 10 that cover the stack structure and that have inlet ports 11 through which air is supplied to the upper electrode layer 6 whereas fuel gas is supplied to lower electrode layer 4 via the porous substrate 2. Here, the electrically conductive gas impermeable layer 3 serves as a component to separate gas, i.e. fuel, which passes inside the porous substrate 2, and gas, i.e. air which passes outside the porous substrate 2.

Also, the number of the cell plate structures 1 for the fuel cell to be laminated is not limited to three pieces as shown and may be laminated in any suitable number of pieces. Further, if desired, the cell plate structure 1 may of course be modified to have a structure such that the lower electrode layer 4 is supplied with air while the upper electrode layer is supplied with fuel gas.

In the SOFC 100 thus produced, the presence of the electrically conductive gas impermeable layers 3b formed on the circumferential peripheries of the respective porous substrates 2 compels the same to have current collecting functions in the respective fuel-cell cell plate structures 1 and to have functions for establishing electrical connection between the component parts in the fuel-cell cell plate structures 1. The interconnectors 9 are also utilized to bear the electrically connecting function between the adjacent fuel-cell cell plate structures 1, thereby establishing electrical connection between the respective fuel-cell cell plate structures 1 in a more reliable manner.

As previously described above, in the fuel-cell cell plate structure according to the present invention, since the substrate does not serve as the electrode, optimization of the substrate material may be achieved taking the differential thermal expansion coefficient between the electrode layer and the electrolyte layer into consideration, with a resultant improvement in heat resistance and heat-resistant shock property.

In addition, the presence of a plurality of divided electrolyte layers formed on the substrate enables thermal stress to be dispersed for precluding the electrolyte layers from being adversely suffered with thermal stress.

Further, since the manufacturing method for the cell plate structure for the fuel cell according to the present invention has a feature for carrying out the step for forming the gas impermeable layer on the porous substrate prior to executing the step for forming the lower electrode and forming the lower electrode layer onto areas of the porous substrate, in which the gas impermeable layer is absent, using patterning process, a feature for carrying out the step for forming the gas impermeable layer onto the porous substrate between the step for forming the lower electrode layer and the step for forming the solid electrolyte layer by patterning and a feature for carrying out the step for laminating the porous substrate, formed with the gas impermeable layer, and the solid electrolyte layer, formed on the temporary substrate, with respect to one another via the lower electrode layer material having the adhesive function and subsequently for forming the lower electrode layer and the solid electrolyte layer using the step for removing the temporary substrate from the porous substrate, the cell plate structure for the fuel cell may be efficiently manufactured at a high quality.

And, the solid electrolyte type fuel cell includes the cell plate structures of the configuration described above, with a resultant excellent advantage such as heat resistance and heat resistance shock property with a reduction in time periods required for start up or stop of the fuel cell.

The entire content of a Patent Application No. TOKUGAN 2001-152885 with a filing date of May 22, 2001 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A cell plate structure for a fuel cell, comprising:
   a porous substrate;
   a lower electrode layer formed on the porous substrate;
   an upper electrode layer opposed to the lower electrode layer;
   a solid electrolyte layer having a layer element placed between the lower electrode layer and the upper electrode layer and composed of a plurality of divided electrolyte regions; and
   a gas impermeable layer correspondingly covering an area where the solid electrolyte layer is absent on the porous substrate or on the lower electrode layer,
   wherein the gas impermeable layer separates gas passing inside the porous substrate and gas passing outside the porous substrate, and an upper surface of the gas impermeable layer is flush with either one of an upper surface of the lower electrode or an upper surface of the solid electrolyte layer.

2. A cell plate structure for the fuel cell according to claim 1, wherein a lower surface of the gas impermeable layer and a lower surface of the solid electrolyte layer are located in a substantially coplanar surface, and an upper surface of the solid electrolyte layer protrudes above the gas impermeable layer.

3. A cell plate structure for the fuel cell according to claim 1, wherein the porous substrate has an electrically insulating property, and the gas impermeable layer has an electrically conductive property.

4. A cell plate structure for the fuel cell according to claim 1, wherein the porous substrate has an electrically conductive property, and the gas impermeable layer has at least a layer element facing the solid electrolyte layer and having an electrically insulating property.

5. A cell plate structure for the fuel cell according to claim 1, wherein both of the porous substrate and the gas impermeable layer are made of metal.

6. A cell plate structure for the fuel cell according to claim 5, wherein the gas impermeable layer includes a layer element facing the solid electrolyte layer and having an electrically insulating property such that the gas impermeable layer has a two-layer structure composed of a metallic layer and the electrically insulating layer element.

7. A cell plate structure for the fuel cell according to claim 1, wherein the porous substrate comprises a multi-layer structure composed of a plurality of layers which have different porosity rates from each other.

8. A cell plate structure for the fuel cell according to claim 1, wherein the porous substrate has a surface layer which serves as a lower electrode layer.

9. A solid electrolyte type fuel cell, comprising:
a cell plate structure for a fuel cell; and
a support member supporting the cell plate structure for the fuel cell,
wherein the cell plate structure for the fuel cell has:
a porous substrate;
a lower electrode layer formed on the porous substrate;
an upper electrode layer opposed to the lower electrode layer;
a solid electrolyte layer having a layer element placed between the lower electrode layer and the upper electrode layer and composed of a plurality of divided electrolyte regions; and
a gas impermeable layer correspondingly covering an area where the solid electrolyte layer is absent on the porous substrate or on the lower electrode layer such that the gas impermeable layer separates gas passing inside the porous substrate and gas passing outside the porous substrate,
wherein an upper surface of the gas impermeable layer is flush with at least one of an upper surface of the lower electrode and an upper surface of the solid electrolyte layer,
and wherein a plurality of cell plate structures, each of which corresponds to the cell plate structure, are laminated with the support member.

10. A cell plate structure for a fuel cell, comprising:
a porous substrate;
a lower electrode layer formed on the porous substrate;
an upper electrode layer opposed to the lower electrode layer;
a solid electrolyte layer having a layer element placed between the lower electrode layer and the upper electrode layer and composed of a plurality of divided electrolyte regions; and
separating means for separating gas passing inside the porous substrate and gas passing outside the porous substrate, the separating means correspondingly covering an area where the solid electrolyte layer is absent on the porous substrate or on the lower electrode layers,
wherein an upper surface of the gas impermeable layer is flush with at least one of an upper surface of the lower electrode and an upper surface of the solid electrolyte layer.

* * * * *